(12) United States Patent
Andersen et al.

(10) Patent No.: US 7,874,170 B2
(45) Date of Patent: Jan. 25, 2011

(54) INTELLIGENT LIGHTING SUPPLY (75) Inventors: Mads Andersen, Odense SV (DK);
Claus Schmidt, Odense NV (DK); Ole Bachmann, Soenderborg (DK); Rune Thomsen, Loegumkloster (DK)

(73) Assignee: Danfoss Compressors GmbH, Flensburg (DE)

( * ) Notice: Subject to any disclaimer, the term of this patent is extended or adjusted under 35 U.S.C. 154(b) by 1122 days.

(21) Appl. No.: 11/527,935

(22) Filed: Sep. 27, 2006

(65) Prior Publication Data

US 2007/0068183 A1   Mar. 29, 2007

(30) Foreign Application Priority Data

Sep. 29, 2005   (DK) ................. 2005 01358

(51) Int. Cl.
*F25B 49/00* (2006.01)
*F25D 27/00* (2006.01)
(52) U.S. Cl. .............. 62/131; 62/230; 362/94
(58) Field of Classification Search ........... 62/131, 62/229, 230; 307/98, 112; 323/234, 299; 362/94
See application file for complete search history.

(56) References Cited

U.S. PATENT DOCUMENTS 5,909,950 A   6/1999  Seok et al. ................ 362/94
6,970,752 B1 * 11/2005  Lim et al. ................. 700/94
2004/0155532 A1 * 8/2004  Brotto .................... 307/326

FOREIGN PATENT DOCUMENTS

| DE | 39 19 960 A1 | 12/1990 |
| JP | 2003-302140 | 10/2003 |
| JP | 2004-239452 | 8/2004 |
| RU | 2 170 185 C2 | 10/2001 |

* cited by examiner

*Primary Examiner*—Marc E Norman
(74) *Attorney, Agent, or Firm*—McCormick, Paulding & Huber LLP (57) ABSTRACT

A method and a control unit (4) for controlling a supply of power to an electrical circuit comprising a switch (3). An output voltage of a first power source (5), which is connected to the circuit, is measured and compared to a predefined threshold voltage. If the measured voltage is smaller than the threshold value it is determined that the switch (3) is in a closed state, and if the voltage is larger than the threshold value it is determined that the switch (3) is in an open state. The supply of power is controlled in accordance with the open/closed state of the switch (3). Preferably, the electrical circuit is connected to a second power source (9) when the switch (3) is in a closed state. Power is conserved while it is ensured that sufficient power is available when needed. The invention is very suitable for supplying power to a lamp (1) positioned inside a refrigeration compartment (2), especially when the system is battery powered.

14 Claims, 6 Drawing Sheets

INTELLIGENT LIGHTING SUPPLY

CROSS-REFERENCE TO RELATED APPLICATIONS

Applicant hereby claims foreign priority benefits under U.S.C. §119 from Danish Patent Application No. PA 2005 01358 filed on Sep. 29, 2005 the contents of which are incorporated by reference herein.

FIELD OF THE INVENTION

The present invention relates to a method for controlling a supply of power to an electrical circuit. The invention further relates to a control unit for controlling a supply of power to an electrical circuit, and to a refrigeration system comprising such a control unit. More particularly, the present invention relates to a method and a control unit for controlling a supply of power to an electrical circuit in such a way that power is saved to the greatest extent possible. The present invention is very suitable for battery driven refrigeration systems, e.g. portable refrigeration system like the ones positioned in road vehicles, such as camper vans, or in water-borne vehicles, such as boats, etc.

BACKGROUND OF THE INVENTION

When battery driven refrigeration systems are positioned in vehicles as described above, it will sometimes occur that the engine of the vehicle is not running, but it is necessary to keep the refrigeration system running. In such cases power for the refrigeration system is only available from a limited source, such as the battery of the vehicle. It is of great importance to use as little power as possible in running the refrigeration system so as to ensure as long a period of refrigeration as possible before the battery requires recharging.

Such a refrigeration system may comprise a control unit and a compressor and associated refrigeration circuit for providing refrigeration to a refrigeration compartment. The refrigeration compartment is often an insulated box with a removable or hingeable door or lid to allow occasional access to the contents of the refrigeration compartment. It may further comprise an illumination device (for example an electric lamp) for lighting the inside of the refrigeration compartment.

One way of conserving power is to close down all unnecessary electronic circuits. For example, the power converter circuits which supply power to the compressor could be shut down when the compressor is not required (that is, when further refrigeration is not required).

Such power supplies may also be used to supply power to other accessories, such as a lamp inside the refrigeration compartment. In the case of a lamp it is important that power is available for the lamp when the door is open, even if the compressor is not running.

Figure 1:
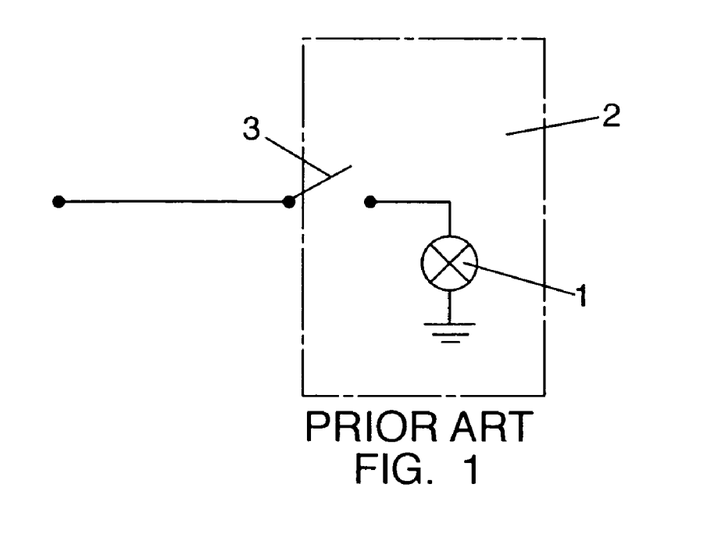
FIG. 1 is a diagrammatic view of a refrigeration compartment with a lamp, and illustrating a prior art method of supplying power to the lamp.

The standard way of controlling lighting in coolers and fridges is by an electrical switch which closes when the door is opened so that the lamp is only lit when the door is open. Such a lighting system is illustrated in FIG. 1, where a lamp 1 is positioned inside a refrigeration compartment 2. The lamp 1 is connected between a power source (not shown) and ground via a switch 3. The switch 3 is connected to a door or a lid in such a manner that the switch 3 is open when the door or lid is closed (thereby preventing a connection between the power source and the lamp 1), and the switch 3 is closed when the door or lid is open (thereby connecting the power source and the lamp 1). In FIG. 1 the switch 3 is open, and accordingly no power is supplied to the lamp 1.

Figure 2:
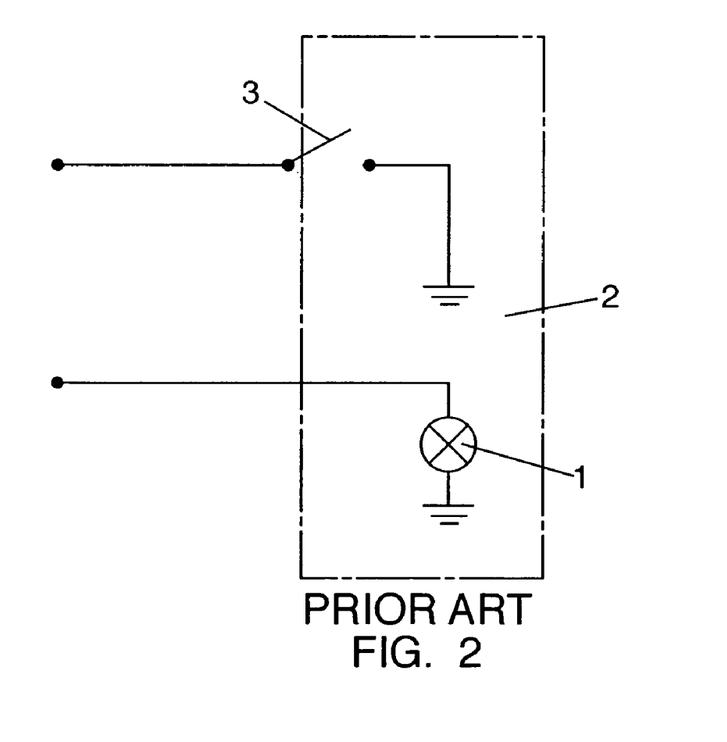
FIG. 2 is a diagrammatic view of a refrigeration compartment with a lamp, and illustrating another prior art method of supplying power to the lamp.

In order to use the facility described above, the power supply must be running all the time, maintaining a voltage on the lamp supply output, even when the lamp is not in use. Since the power supply circuits use some power in this mode, even if no power is being consumed by the lamp, it is a disadvantage. One possible solution is to use two circuits, one leading to the switch (in order to monitor whether it is open or closed), and a second one leading to the lighting device itself and supplied with power from a power supply which runs only when the door is open. This is illustrated in FIG. 2. This solution is not the optimum since it requires extra wiring (and therefore entails extra cost) and, since it is not an industry standard, requires the manufacturers of refrigeration systems to modify their product to accommodate the new control system.

When the compressor is required (that is, when refrigeration is required) there is little additional cost in running a power supply for lighting the lamp, even if the lamp is not lit. However, when cooling is not required it would be an advantage to monitor the door state whilst using very little power, and without the use of extra circuitry external to the control unit.

SUMMARY OF THE INVENTION

It is thus an object of the invention to provide a method for controlling a supply of power to an electrical circuit, which method conserves power to a maximum extent.

It is a further object of the invention to provide a method for controlling a supply of power to an electrical circuit without the requirement of additional wiring or other modifications to standard products.

It is an even further object of the invention to provide method for monitoring a switch for a lamp positioned in a refrigeration compartment of a battery driven refrigeration system in such a manner that power is conserved to a maximum extent without the requirement of additional wiring or other modifications as compared to standard battery driven refrigeration systems.

It is an even further object of the invention to provide a control unit for controlling a supply of power to an electrical circuit, and which conserves power to a maximum extent.

It is an even further object of the invention to provide a control unit for controlling a supply of power to an electrical circuit, which is cost effective to manufacture and which is suitable for use in standard battery driven refrigeration systems.

It is an even further object of the invention to provide a battery driven refrigeration system wherein power is conserved to a maximum extent while ensuring that power is supplied to various components of the refrigeration system when required.

According to a first aspect of the invention the above and other objects are fulfilled by providing a method for controlling a supply of power to an electrical circuit comprising a switch, the method comprising:

measuring an output voltage of a first power source connected to the electrical circuit and comparing the measured output voltage to a predefined threshold voltage,     in case the measured output voltage is smaller than the predefined threshold voltage, determining that the switch is in a closed state, and in case the measured voltage is larger than or equal to the predefined threshold, determining that the switch is in an open state, and     controlling the supply of power in accordance with the determined state of the switch.

According to a second aspect of the invention the above and other objects are fulfilled by providing a control unit for controlling a supply of power to an electrical circuit comprising a switch, the control unit comprising:

a first power source connected to the electrical circuit, means for measuring an output voltage of the first power source, means for comparing the measured output voltage to a predefined threshold voltage, and for generating a corresponding output signal, means for determining whether the switch is in an open or a closed state based on the generated output signal, and means for controlling the supply of power according to the determined state of the switch.

The supply of power to the electrical circuit should preferably be sufficient to ensure that components in the circuit can operate in an appropriate manner. Thus, when the supply of power is controlled in accordance with the determined state of the switch, this should preferably be understood in such a way that the control unit ensures that sufficient power is supplied to the electric circuit when required while ensuring that no excessive power is supplied when the component(s) of the electric circuit do not require power. In most cases, power will be required when the switch is in a closed state, while power is not required when the switch is in an open state. However, a reverse situation could be envisaged.

The first power source is connected to the electrical circuit, preferably via the switch, i.e. preferably in such way that a connection is established between the first power source and components of the electrical circuit when the switch is in a closed state, while such a connection is interrupted when the switch is in an open state.

The output voltage of the first power source, i.e. the voltage supplied by the first power source, is preferably measured directly across an output terminal of the first power source.

The measured output voltage is compared to a predefined threshold value. The configuration of the first power source and the position of the switch relatively to the first power source should be such that when the switch is in an open state, the measured output voltage is maintained at a relatively high level, e.g. within the interval 9.6 V to 31.5 V. This could, e.g., be the standard voltage supplied by the battery of the vehicle. However, when the switch is closed a current will run from the first power source to components of the electrical circuit, and this causes the measured output voltage to drop to a lower level, e.g. a few mV. The threshold value should be chosen in between these voltage levels. Thereby a measured output voltage above the threshold value will indicate that the switch is in the open state, and a measured output voltage below the threshold value will indicate that the switch is in the closed state.

The drop in voltage level when the switch is closed may be obtained by including a relatively high internal impedance, preferably a high resistance, in the first voltage source. This will be described further below.

It is an advantage that the position of the switch, and thereby the need for power supply to the electrical circuit, is determined simply by measuring the output voltage of the first power source and comparing it to a threshold value, because this requires very little power as long as the switch is in an open position. Thereby the system only consumes power to the extent that it is necessary, i.e. power is conserved to the maximum extent. On the other hand, when power is required the supply of power is controlled accordingly, thereby providing the necessary power to the component(s) of the electrical circuit. Furthermore, the monitoring of the position of the switch can be performed on standard devices, such as standard battery driven coolers or fridges, without the requirement of additional wiring or other substantial modifications.

The controlling step may comprise connecting the electrical circuit to a second power source outputting a voltage which is measurably different from the measured output voltage of the first power source. In this case the control unit may further comprise a second power source, and the controlling means may comprise means for connecting the second power source to the electrical circuit. In this embodiment the supply of power is preferably controlled in such a way that when it is determined that the switch is in a closed state and that power is therefore required for the component(s) of the electrical circuit, the second power source is connected to the electrical circuit in order to provide the required power. On the other hand, the second power source stays disconnected from the electrical circuit as long as the switch is in an open state and power is therefore not required for the component(s) of the electrical circuit. Thereby power is conserved to the maximum extent possible while it is ensured that sufficient power is provided when required.

The output voltage supplied by the second power source is measurably different from the measured output voltage of the first power source irrespective of whether the switch is in an open or closed state. Thereby a measurably different voltage is supplied to the electrical circuit when the second power source is connected thereto. In the present context the term 'measurably different' should be interpreted to mean that the difference between the two voltage levels is sufficiently large that it can easily be measured by standard equipment. For instance, the difference should not be difficult to detect, and it should be significantly larger than the statistical and systematic errors of the measuring equipment. For instance, the voltage supplied by the first power source may be approximately 20 V-25 V while the voltage supplied by the second power source may be approximately 12 V.

The method may further comprise the steps of at least substantially continuously measuring an input voltage supplied to the electrical circuit, and determining, based on said measurement, whether the switch is in an open or a closed state. In this embodiment the state of the switch is at least substantially continuously monitored by monitoring the input voltage supplied to the electrical circuit. In a preferred embodiment this is done in the following manner. When the switch is moved from an open state to a closed state a significant drop in the measured voltage is detected. As a consequence the control unit will 'know' that the electrical circuit needs power, and the second power source is accordingly connected to the electrical circuit in order to provide the required power. When the switch is subsequently moved back to the open state the measured voltage increases dramatically, and in response to this the control unit will disrupt the connection between the second power source and the electrical circuit in order to conserve power while it is not required.

The method may further comprise the steps of:

measuring a temperature in a refrigeration compartment and comparing the measured temperature to a predefined threshold temperature, and in case the measured temperature is higher than the predefined threshold temperature, supplying power to a compressor connected to a refrigeration circuit for providing refrigeration to the refrigeration compartment.

In this embodiment the method is preferably used for controlling the supply of power to one or more electrical circuits of a refrigeration system comprising a refrigeration compartment. Such a refrigeration system could advantageously be a portable and battery driven refrigeration system, such as the ones which are positioned in vehicles as described above. According to this embodiment the temperature in the refrigeration compartment is measured and the compressor is controlled (i.e. switched on/off) in order to obtain and maintain a desired target temperature in the refrigeration compartment. When performing the method according to this embodiment it will be possible to control the supply of power to the electrical circuit comprising the switch, as well as to the compressor, and the controlling may be performed with due consideration to the need for power to component(s) of the electrical circuit (this may, e.g., comprise a lamp positioned inside the refrigeration compartment) as well as the need for power to the compressor. The same power sources may even be used for both purposes.

In one embodiment the first power source may have an internal impedance which is sufficiently high to provide a measurable lowering of the measured output voltage when the switch is moved to the closed state. Preferably, the internal impedance is in the form of an internal resistance. In this embodiment the switch is preferably arranged in such a way that when it is closed a connection is established between the first power source and one or more components of the electrical circuit. Due to the relatively high internal impedance the output voltage of the first power source will be dragged down significantly when the switch is closed, thereby connecting the first power source to the component(s) of the electrical circuit. The internal impedance should be sufficiently high to provide a measurable voltage drop. The voltage drop should at least be large enough to ensure that the measured output voltage drops from a level well above the threshold value to a level well below the threshold value when the switch is closed. Thereby the measured output voltage will clearly indicate whether the switch is in an open or a closed state.

The first power source may have an internal impedance, preferably an internal resistance, within the interval 100 kΩ to 1000 kΩ, such as within the interval 150 kΩ to 700 kΩ, such as within the interval 200 kΩ to 600 kΩ, such as approximately 500 kΩ, such as approximately 510 kΩ, or such as within the interval 500 kΩ to 1000 kΩ.

The control means may comprise a microcontroller. The microcontroller may be used solely for controlling the supply of power to the electrical circuit, e.g. to a lamp positioned inside a refrigeration compartment of a refrigeration system. However, the microcontroller may additionally be used for controlling other parts of such a refrigeration system, e.g. power supply to a compressor, etc. Such parts may be controlled independently, but they may, alternatively, be controlled with due consideration to each other, e.g. in such a way that information relating to whether or not the compressor is running will be used when controlling the supply of power to a lamp positioned inside a refrigeration compartment, etc.

Thus, the electrical circuit may comprise a lamp connected in series with the switch.

According to a third aspect of the invention the above and other objects are fulfilled by providing a refrigeration system comprising a control unit according to the second aspect of the invention and a refrigeration circuit for providing refrigeration to a refrigeration compartment, the refrigeration circuit comprising a compressor and an evaporator, the compressor being connected to the control unit.

It should be noted that a skilled person would readily recognise that any feature described in connection with the first aspect of the invention may also be combined with the second and third aspects of the invention, that any feature described in connection with the second aspect of the invention may also be combined with the first and third aspects of the invention, and that any feature described in connection with the third aspect of the invention may also be combined with the first and second aspects of the invention.

The compressor of the refrigeration system is connected to the control unit. Thus, the control unit is preferably adapted to control the compressor as well as the supply of power to the electrical circuit.

The refrigeration system may further comprise a lamp positioned in the interior of the refrigeration compartment, the lamp forming part of the electrical circuit. Such a lamp is often used for providing lighting for the interior of the refrigeration compartment when it is opened in order to position or gain access to items stored in the refrigeration compartment.

In one embodiment the refrigeration system may further comprise a temperature sensor positioned in the interior of the refrigeration compartment for measuring the temperature in the interior of the refrigeration compartment. In this case the control unit may be adapted to control the compressor in response to a temperature measurement by the temperature sensor. In this embodiment the compressor is controlled (i.e. switched on/off) on the basis of the need for refrigeration of the refrigeration compartment, and in such a manner that the temperature inside the refrigeration compartment is maintained within a desired temperature interval. Thus, the temperature inside the refrigeration compartment is monitored, and in case it drops below a lower limit, the compressor is switched off, and in case it increases above an upper limit, the compressor is switched on, thereby providing refrigeration.

The refrigeration compartment preferably comprises access means operable to be in an open position providing access between the interior of the refrigeration compartment and the exterior and in a closed position in which such access is prevented, in which case the switch is in an open state when the access means is in a closed position, and the switch is in a closed state when the access means is in an open position. The access means will typically be in the form of a lid or a door, e.g. a hinged door, as is known from ordinary fridges or coolers. Thus, the switch is preferably connected to the lid or door in such a way that the switch is closed when the door is opened and vice versa.

Preferably, the refrigeration system is battery driven. However, the invention could also be applied in refrigeration systems which are not battery driven, but where it is nevertheless desirable to save power to the greatest extent possible.

BRIEF DESCRIPTION OF THE DRAWINGS

The invention will now be further described with reference to the accompanying drawings in which.

DETAILED DESCRIPTION OF THE DRAWINGS INVENTION

FIGS. 1 and 2 illustrate prior art and have already been described above.

Figure 3:
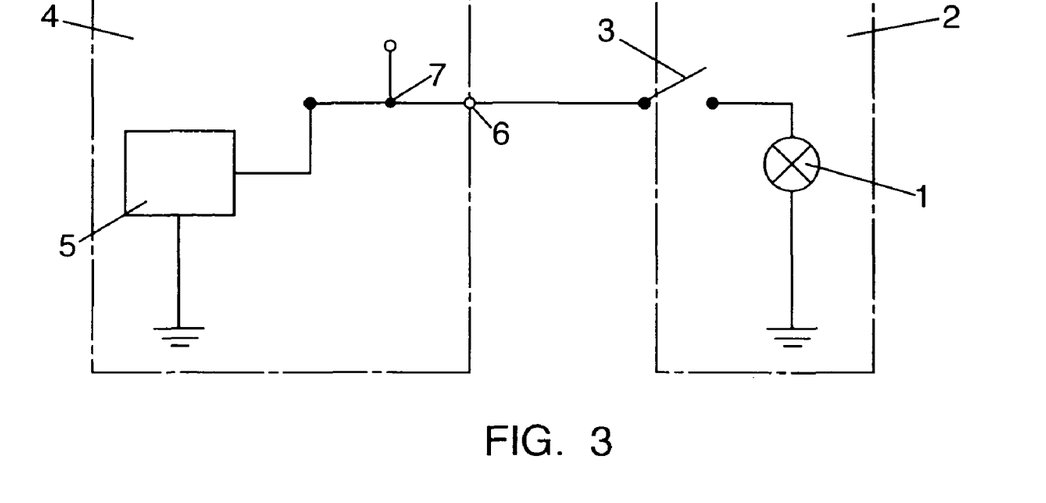
FIG. 3 is a diagrammatic view of refrigeration compartment with a lamp and a control unit according to an embodiment of the invention.

FIG. 3 is a diagrammatic view of a refrigeration compartment 2 with a lamp 1 and a control unit 4 according to an embodiment of the invention. The control unit 4 comprises a first power source 5 and a lamp supply output 6. The voltage level outputted by the first power source 5 via the lamp supply output 6 can be measured at measuring point 7.

The first power source 5 and the lamp 1 are connected via a switch 3. In FIG. 3 the switch 3 is in an open state, and therefore no connection is established between the first power source 5 and the lamp 1. Consequently, no power is supplied to the lamp 1, and it is therefore not lit. The lamp 1 is preferably of the kind providing lighting to the interior of the refrigeration compartment 2. The switch 3 is preferably connected to a door or a lid of the refrigeration compartment 2 in such a manner that the switch 3 is in an open state when the door or lid is closed and in a closed state when the door or lid is open, and the lamp 1 therefore needs to be turned on.

The first power source 5 has a relatively high internal resistance, and the control unit 4 of FIG. 3 therefore preferably functions in the following manner.

When the switch 3 is in an open state the voltage level measured at measuring point 7 will be at a substantially constant and relatively high level, $V_1$. When the switch 3 is moved to a closed state, the high internal resistance of the first power source 5 causes the measured voltage level to drop dramatically to a lower level, $V_2$. Thus, simply by measuring the voltage level at measuring point 7 it is possible to tell whether the switch 3 is in an open or a closed state, and this can be done with a minimum use of power. The plot of FIG. 4 illustrates this.

Figure 4:
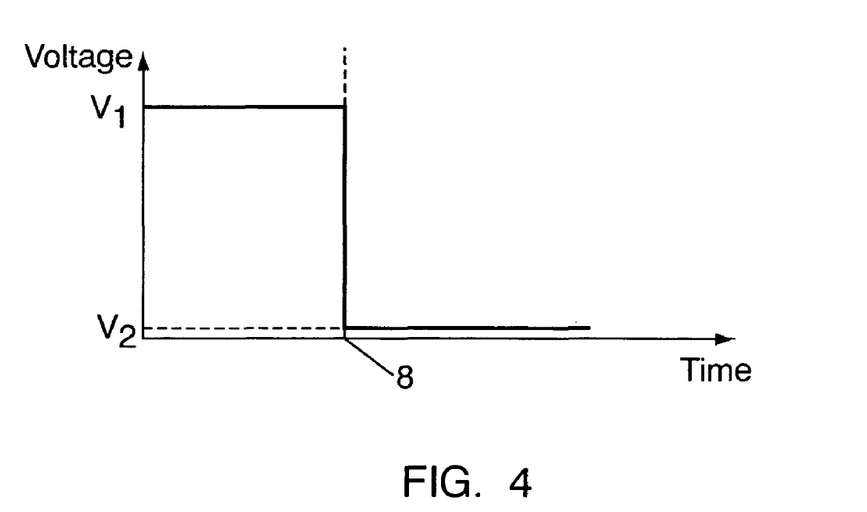
FIG. 4 is a plot of an output voltage as a function of time and measured in the control unit of FIG. 3.

FIG. 4 is a plot of a voltage measured at measuring point 7 in the diagram of FIG. 3 as a function of time. At time 8 the switch 3 is moved to the closed state, and as a consequence the voltage level drops dramatically from a level $V_1$ to a level $V_2$. Thus, by choosing a threshold voltage value between $V_2$ and $V_1$, it will be possible to measure whether the switch 3 is in an open or a closed state, simply by comparing the measured voltage to the threshold value.

Figure 5:
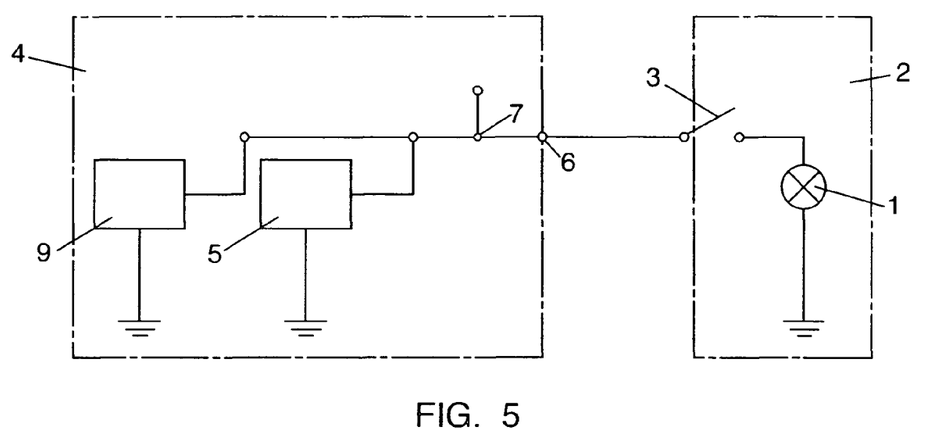
FIG. 5 is a diagrammatic view of a refrigeration compartment with a lamp and a control unit according to a second embodiment of the invention.

FIG. 5 is a diagrammatic view of a refrigeration compartment 2 with a lamp 1 and a control unit 4 according to a second embodiment of the invention. The embodiment of FIG. 5 has a number of components in common with the embodiment of FIG. 3, and these components have been designated by the same reference numerals. In addition to the first power source 5 the control unit 4 shown in FIG. 5 has a second power source 9 which may also be connected to the lamp 1 via the switch 3.

The first power source 5 functions in the manner described above in connection with FIG. 3. When it has been established that the switch 3 is in a closed state, and the lamp 1 accordingly needs a supply of power which is sufficient to turn the lamp 1 on, the second power source 9 is connected to the lamp supply output 6. The second power source 9 should accordingly be configured in such a manner that it is able to supply the necessary power to the lamp 1 when this situation occurs. The second power source 9 is, of course, not connected instantaneously to the lamp 1 when the door or lid of the refrigeration compartment 2 is opened. However, this will happen relatively quickly, typically within approximately 0.5 s, i.e. quickly enough to seem instantaneous for a person opening the door or lid of the refrigeration compartment 2.

Thus, according to the embodiment shown in FIG. 5 a sufficient supply of power to the lamp 1 is ensured whenever this is needed, while the power consumption of the apparatus is kept as low as possible when the lamp 1 does not need to be lit.

Figure 6:
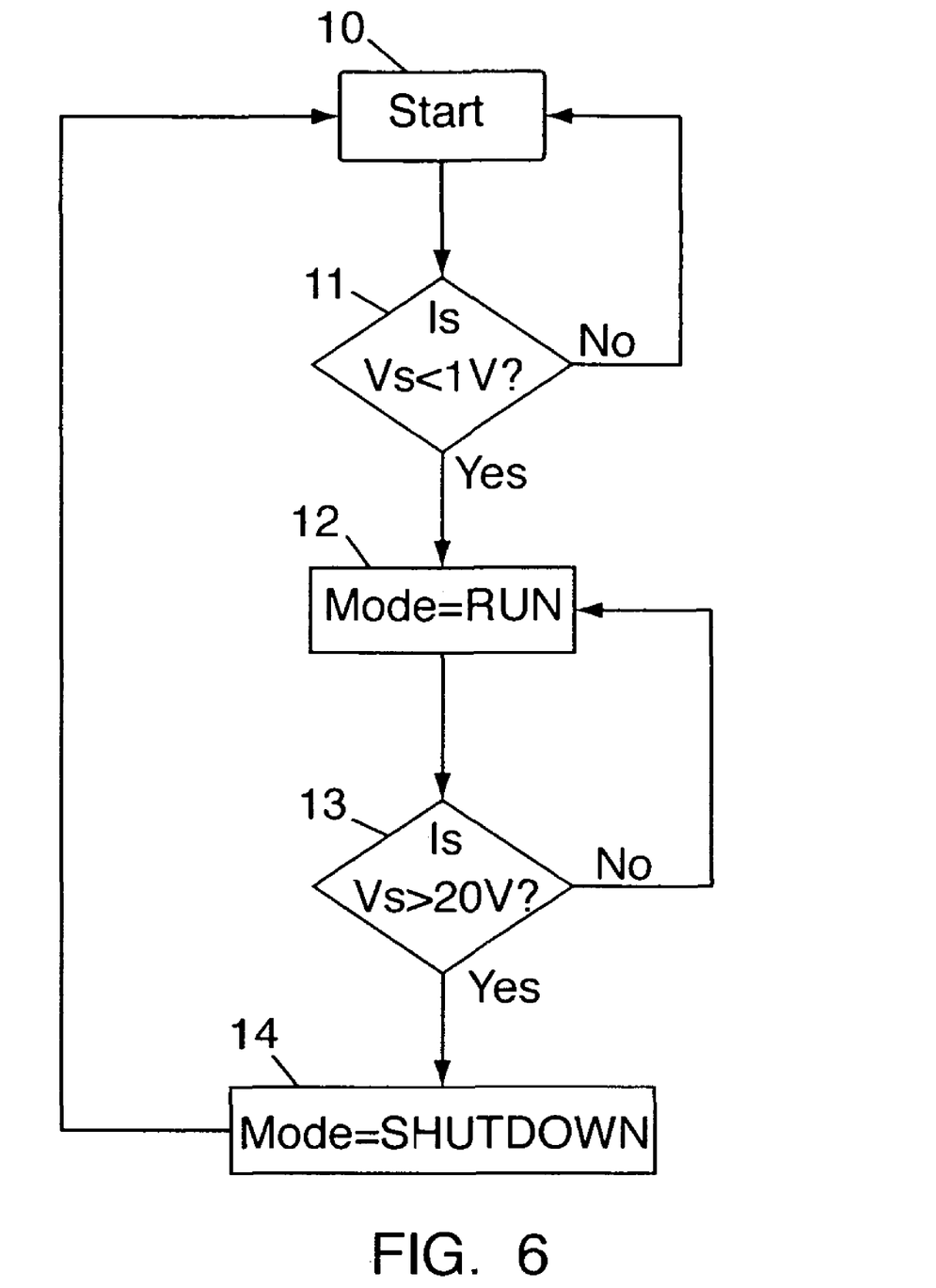
FIG. 6 is a flow chart illustrating a method of operating a control unit according to an embodiment of the invention.

FIG. 6 is a flow chart illustrating a method of operating a control unit, e.g. the control unit 4 of FIG. 3 or the control unit 4 of FIG. 5.

The process illustrated in the flow chart of FIG. 6 starts at step 10. Initially it is investigated at step 11 whether or not the voltage, $V_s$, measured at the measuring point (7 in FIGS. 3 and 5) is smaller than 1 V. If this is not the case, it is decided that the switch is still in an open state, and the process is returned to step 10. If, on the other hand, $V_s$ is smaller than 1 V, it is decided that the switch has been moved into a closed state. Accordingly, the control unit is set to 'RUN' mode at step 12, i.e. the control unit must ensure that sufficient power is supplied to the lamp, thereby providing lighting in the interior of the refrigeration compartment.

While the control unit is in the 'RUN' mode, it is investigated, at step 13, whether or not the voltage, $V_s$, measured at the measuring point (7 in FIGS. 3 and 5) is larger than 20 V. If this is not the case, it is decided that the switch is still in a closed state, and that lighting is therefore still needed in the interior of the refrigeration compartment. Accordingly, the control unit should remain in the 'RUN' mode, and the process is therefore returned to step 12. If, on the other hand, $V_s$ is larger than 20 V, it is decided that the switch has been moved to an open state, and that lighting is therefore no longer required in the interior of the refrigeration compartment. Accordingly, the control unit is set to 'SHUTDOWN' mode, i.e. it is set to a mode in which only the minimum necessary power is supplied to the parts of the control unit. Subsequently, the process is returned to step 10 in order to continue monitoring the state of the switch.

Thus, according to the method illustrated in FIG. 6, power is conserved to the maximum possible extent because the control unit is set to 'SHUTDOWN' mode as soon as power is not required by the lamp. However, it is still ensured that sufficient power is supplied to the lamp when this is required, i.e. when the switch is moved into a closed state.

Figure 7:
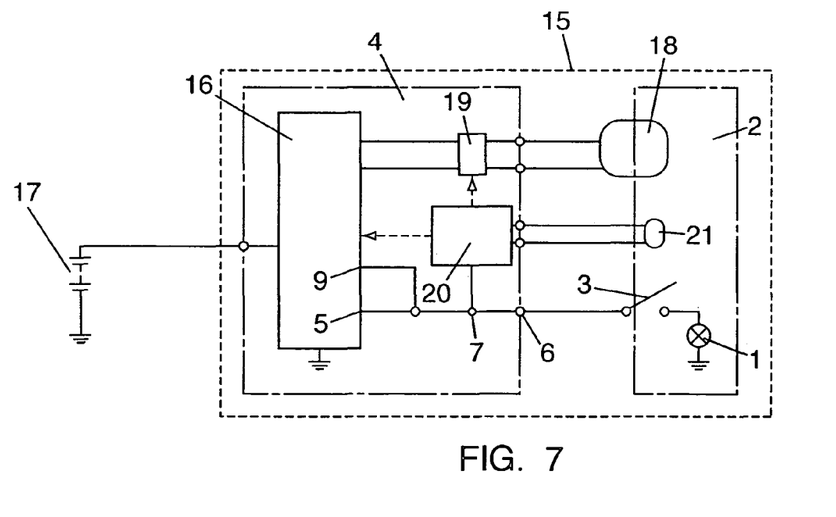
FIG. 7 is a diagrammatic view of a refrigeration compartment with a lamp and a control unit according to a third embodiment of the invention.

FIG. 7 shows a coolbox system 15 comprising a refrigeration compartment 2 with a lamp 1, and a control unit 4. The control unit 4 can supply power to the lamp 1 via a lamp supply output 6 and a switch 3 similarly to what is described above in connection to FIGS. 3 and 5. Thus, the control unit 4 comprises a first power source 5 and a second power source 9 arranged in a power supply unit 16. The power supply unit 16 is in turn connected to a vehicle battery 17. The voltage of the vehicle battery 17 can typically range from 9.6 V to 31.5 V.

The coolbox system 15 further comprises a refrigeration circuit 18 comprising a compressor and an evaporator for providing refrigeration to the refrigeration compartment 2. The compressor is controlled by a compressor controller 19 in such a way that the compressor is started when refrigeration is required in the interior of the refrigeration compartment 2, and the compressor is stopped when refrigeration is no longer required. The compressor controller 19 as well as the compressor are connected to the power supply unit 16 and are powered in that manner. However, in most cases the lamp 1 and the compressor will be powered by separate power supplies, and the power supply unit 16 will therefore comprise two separate power supplies, i.e. one for powering the lamp 1 and one for powering the compressor.

The control unit 4 further comprises a microcontroller 20. The microcontroller 20 receives inputs from the voltage measurement at measuring point 7 and from a temperature measurement from a temperature probe 21 positioned inside the refrigeration compartment 2. Thus, the microcontroller 20 receives information relating to the voltage level at measuring point 7, and thereby relating to the state of the switch 3, and it receives information relating to the temperature in the interior of the refrigeration compartment 2, and thereby relating to the need for refrigeration. In response to this information the microcontroller 20 sends control signals to the power supply unit 16 and to the compressor controller 19. Thus, in case the temperature measurement indicates that refrigeration is required in the refrigeration compartment 2 or that refrigeration is no longer required, the microcontroller 20 will send a signal to the compressor controller to turn the compressor on or off accordingly. It will also send a signal to the power supply unit 16 to supply sufficient power to the compressor, or to stop supplying power to the compressor. In addition, in case the voltage measurement indicates that the switch 3 has been moved into an open or a closed state, the microcontroller 20 will send a signal to the power supply unit 16 to disconnect or connect the second power source 9 to/from the lamp supply output 6 accordingly. In the case that the power supply unit 16 comprises two separate power supplies as described above, the microcontroller 20 is preferably able to communicate with both of these.

Due to the fact that the microcontroller 20 receives information relating to the need for refrigeration as well as information relating to the state of the switch 3, and the microcontroller 20 therefore is able to control the operation of the compressor as well as the supply of power, it is also able to control these things in a mutually dependent manner. When the compressor is running the second power source 9 will already be connected to the lamp supply output 6. If the switch 3 is closed in this situation, sufficient power will therefore already be available to run the lamp 1, and it will therefore not be necessary to take any additional measures. This may, e.g., be controlled in one of the following ways. The threshold value may be chosen in such a way that closing the switch 3 does not cause the measured voltage to drop below the threshold value, and therefore the microcontroller 20 will not detect that the switch 3 has been closed, and accordingly nothing further will happen. Alternatively or additionally, the microcontroller 20 will already have the information that the compressor is running, and therefore it 'knows' that the second power source 9 is already connected to the lamp supply output 6. Therefore, even though the microcontroller 20 detects that the switch 3 has been closed, it will not do anything further.

Figure 8:
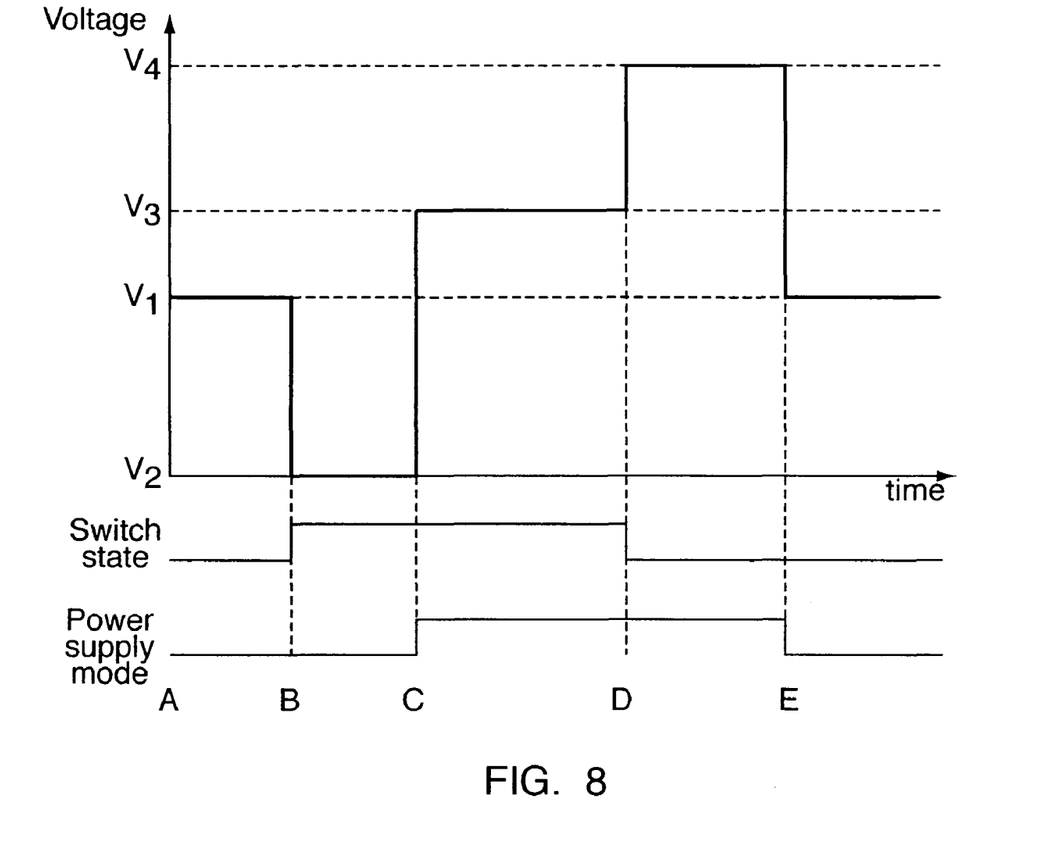
FIG. 8 is a plot of an output voltage as a function of time and measured in the control unit of FIG. 7.

FIG. 8 is a plot of an output voltage as a function of time and measured in the control unit of FIG. 7. Thus, FIG. 8 illustrates the operation of the control unit of FIG. 7. Below the plot is shown the state of the switch and the power supply mode during corresponding time intervals. A low position of the switch state corresponds to an open switch, i.e. a closed door, while a high position corresponds to a closed switch, i.e. an open door. Similarly, a low position of the power supply mode corresponds to 'SHUTDOWN' mode, while a high position of the power supply mode corresponds to 'RUN' mode. For clarity, it is assumed that the compressor is not running during the entire time interval plotted in FIG. 8.

During the time interval A to B the switch is open and the power supply is in 'SHUTDOWN' mode. In this case the power consumption should be kept at a minimum level. Accordingly, the voltage measured at the measurement point (7 in FIG. 7) is maintained at a relatively high level, $V_1$, supplied by the first power source as described above in connection with FIG. 4. At time B the door of the refrigeration compartment is opened, and as a consequence the switch is moved into a closed state. Thereby the voltage level drops dramatically to $V_2$ due to the high internal resistance of the first power source as described above. Since the output voltage is measured and the result of the measurement supplied to the microcontroller, the microcontroller detects that the door has been opened. In accordance therewith the microcontroller communicates a signal to the power supply unit indicating that the control unit should be set to 'RUN' mode, i.e. sufficient power must be supplied to the lamp. This occurs at time C, and the voltage level is accordingly increased to the higher level $V_3$. This is maintained until, at time D, the door is once again shut, thereby opening the switch. This causes the voltage level to be further increased to $V_4$. This increase is also detected by the microcontroller, and as a response the microcontroller communicates a signal to the power supply unit indicating that the control unit should be set to 'SHUTDOWN' mode. This is done at time E, where the voltage level accordingly again drops to $V_1$. In a preferred embodiment the values of $V_1$-$V_4$ could be as follows. $V_1$ approximately 9 V, $V_2$ a few mV, $V_3$ approximately 12 V, and $V_4$ approximately 20 V-25 V.

Figure 9:
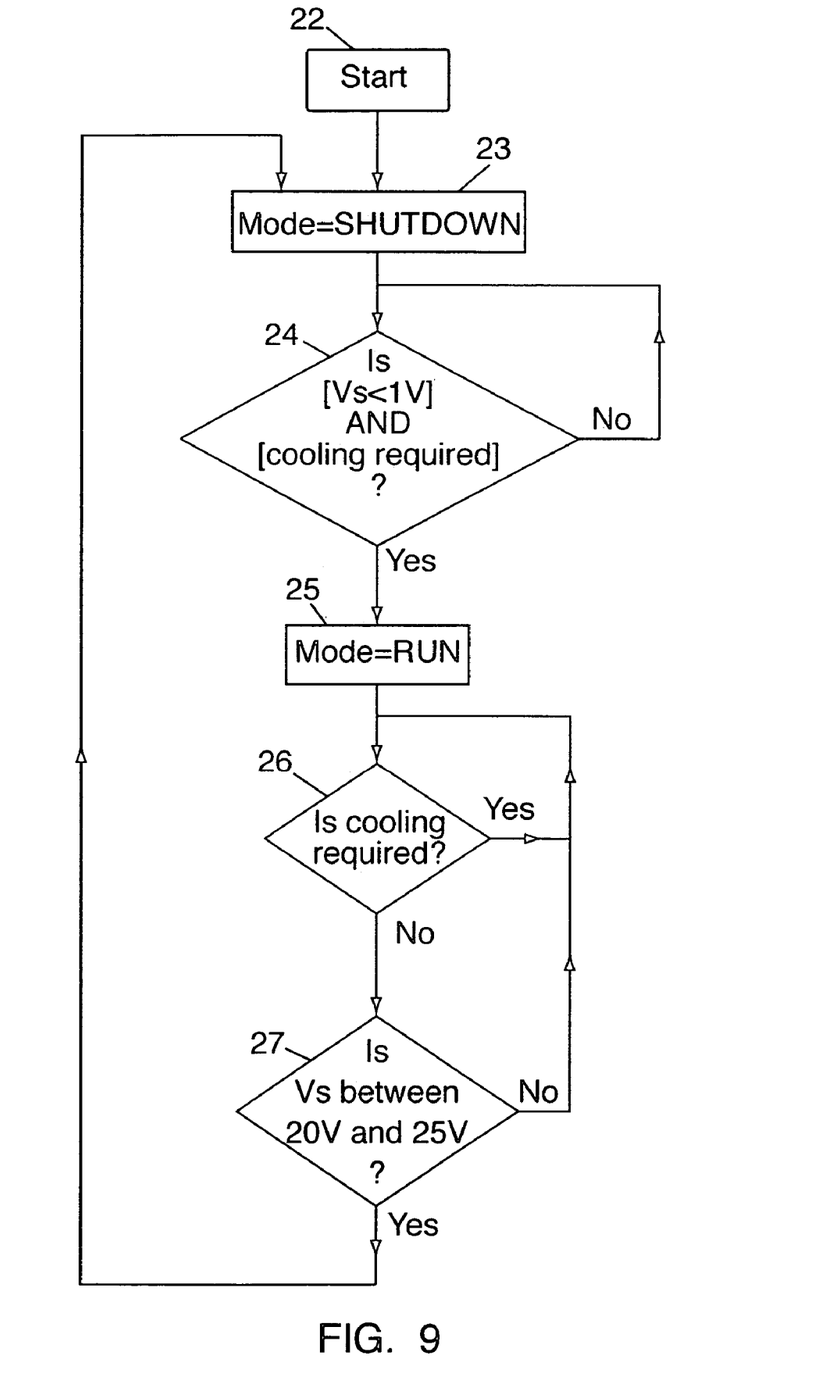
FIG. 9 is a flow chart illustrating a method of operating a control unit according to an embodiment of the invention.

FIG. 9 is a flow chart illustrating a method of operating a control unit according to an embodiment of the invention. The method illustrated in FIG. 9 is particularly suitable for operating a coolbox system as the one shown in FIG. 7.

The process is started at step 22. At step 23 the control unit is set to 'SHUTDOWN' mode. At step 24 it is investigated whether the voltage, $V_s$, measured at measuring point (7 in FIG. 7) is smaller than 1 V and, based on a temperature measurement, whether cooling is required in the refrigeration compartment. If $V_s$ is not smaller than 1 V and cooling is not required the power consumption should still be kept at a minimum, i.e. the control unit should remain in 'SHUTDOWN' mode. Therefore the process is, in this case, returned to step 23.

If, on the other hand, $V_s$ is smaller than 1 V or cooling is required either the compressor, the lamp or both need additional power. In order to ensure that they receive sufficient power the control unit is set to 'RUN' mode at step 25.

Subsequently, at step 26, it is investigated by means of a temperature measurement whether or not cooling is required. If this is the case, the control unit should remain in the 'RUN' mode, and the process is therefore returned to step 25. If cooling is not required, it is investigated, at step 27, whether or not the measured voltage, $V_s$, is within the interval 20 V to 25 V. If this is not the case, the switch is still in a closed state, and power is therefore still required for the lamp. Accordingly, the control unit must remain in 'RUN' mode, and the process is therefore returned to step 25.

If, on the other hand, $V_s$ is within the interval 20 V to 25 V, it can be determined that the switch has been moved to an open position, and that the lamp therefore no longer requires the additional power. Accordingly, the control unit should be set to 'SHUTDOWN' mode, and the process is therefore returned to step 23.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for controlling a supply of power to a refrigeration system comprising a switch, the method comprising:
   measuring an output voltage of a first power source connected to the refrigeration system and comparing the measured output voltage to a predefined threshold voltage,
   in case the measured output voltage is smaller than the predefined threshold voltage, determining that the switch is in a closed state, and in case the measured voltage is larger than or equal to the predefined threshold, determining that the switch is in an open state, and
   controlling the supply of power in accordance with the determined state of the switch.

2. The method according to claim 1, wherein the controlling step comprises connecting the refrigeration system to a second power source outputting a voltage which is measurably different from the measured output voltage of the first power source.

3. The method according to claim 1, further comprising the steps of at least substantially continuously measuring an input voltage supplied to the refrigeration system, and determining, based on said measurement, whether the switch is in an open or a closed state.

4. The method according to claim 1, further comprising the steps of:
   measuring a temperature in a refrigeration compartment and comparing the measured temperature to a predefined threshold temperature, and
   in case the measured temperature is higher than the predefined threshold temperature, supplying power to a compressor connected to a refrigeration circuit for providing refrigeration to the refrigeration compartment.

5. A refrigeration system comprising:
   a control unit for controlling a supply of power to an electrical circuit comprising a switch, the control unit comprising:
      a first power source connected to the electrical circuit,
      means for measuring an output voltage of the first power source,
      means for comparing the measured output voltage to a predefined threshold voltage, and for generating a corresponding output signal,
      means for determining whether the switch is in an open or a closed state based on the generated output signal, and
      means for controlling the supply of power according to the determined state of the switch, and
   a refrigeration circuit for providing refrigeration to a refrigeration compartment, the refrigeration circuit comprising a compressor and an evaporator, the compressor being connected to the control unit.

6. The refrigeration system according to claim 5, further comprising a second power source, and wherein the controlling means comprises means for connecting the second power source to the electrical circuit.

7. The refrigeration system according to claim 6, wherein the first power source has an internal impedance which is sufficiently high to provide a measurable lowering of the measured output voltage when the switch is moved to the closed state.

8. The refrigeration system according to claim 7, wherein the first power source has an internal impedance within the interval 100 k$\Omega$ to 1000 k$\Omega$.

9. The refrigeration system according to claim 5, wherein the control means comprises a microcontroller.

10. The refrigeration system according to claim 5, wherein the electrical circuit comprises a lamp connected in series with the switch.

11. The refrigeration system according to claim 5, further comprising a lamp positioned in the interior of the refrigeration compartment, the lamp forming part of the electrical circuit.

12. The refrigeration system according to claim 5, further comprising a temperature sensor positioned in the interior of the refrigeration compartment for measuring the temperature in the interior of the refrigeration compartment, and wherein the control unit is adapted to control the compressor in response to a temperature measurement by the temperature sensor.

13. The refrigeration system according to claim 5, wherein the refrigeration compartment comprises access means operable to be in an open position providing access between the interior of the refrigeration compartment and the exterior and in a closed position in which such access is prevented, and wherein the switch is in an open state when the access means is in a closed position, and the switch is in a closed state when the access means is in an open position.

14. The refrigeration system according to claim 5, wherein the refrigeration system is battery driven.

* * * * *